(12) United States Patent
Choi et al.

(10) Patent No.: US 12,003,747 B2
(45) Date of Patent: Jun. 4, 2024

(54) METHOD FOR OUTPUT LAYER SET SIGNALING IN SCALABLE VIDEO STREAM

(71) Applicant: TENCENT AMERICA LLC, Palo Alto, CA (US)

(72) Inventors: Byeongdoo Choi, Palo Alto, CA (US); Stephan Wenger, Hillsborough, CA (US); Shan Liu, Vancouver, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 185 days.

(21) Appl. No.: 17/578,977

(22) Filed: Jan. 19, 2022

(65) Prior Publication Data

US 2022/0141479 A1   May 5, 2022

Related U.S. Application Data

(63) Continuation of application No. 17/030,950, filed on Sep. 24, 2020, now Pat. No. 11,265,567.

(60) Provisional application No. 62/912,275, filed on Oct. 8, 2019.

(51) Int. Cl.
*H04N 19/44* (2014.01)
*H04N 19/187* (2014.01)
*H04N 19/46* (2014.01)
*H04N 19/70* (2014.01)

(52) U.S. Cl.
CPC ........... *H04N 19/44* (2014.11); *H04N 19/187* (2014.11); *H04N 19/46* (2014.11); *H04N 19/70* (2014.11)

(58) Field of Classification Search
CPC ...... H04N 19/44; H04N 19/187; H04N 19/46; H04N 19/70; H04N 19/30; H04N 19/157
See application file for complete search history.

(56) References Cited

U.S. PATENT DOCUMENTS

| 2013/0195201 A1* | 8/2013 | Boyce | H04N 19/44 375/240.25 |
|---|---|---|---|
| 2014/0301476 A1 | 10/2014 | Deshpande | |
| 2015/0103888 A1 | 4/2015 | Chen et al. | |

(Continued)

FOREIGN PATENT DOCUMENTS

| CN | 105409219 A | 3/2016 |
|---|---|---|
| WO | 2021/061530 A1 | 4/2021 |

OTHER PUBLICATIONS

Communication dated Sep. 6, 2022 from the Japanese Patent Office in Japanese Application No. 2021-554632.

(Continued)

*Primary Examiner* — Richard T Torrente
(74) *Attorney, Agent, or Firm* — Sughrue Mion, PLLC

(57) ABSTRACT

A method of decoding an encoded video bitstream using at least one processor includes obtaining a coded video sequence including a plurality of output layer sets from the encoded video bitstream; obtaining a first flag indicating whether each output layer set of the plurality of output layer sets includes more than one layer; based on the first flag indicating that the each output layer set includes more than the one layer, obtaining a first syntax element indicating an output layer set mode; selecting at least one layer from among layers included in the plurality of output layer sets as at least one output layer based on at least one of the first flag and the first syntax element; and outputting the at least one output layer.

19 Claims, 7 Drawing Sheets

(56) References Cited

U.S. PATENT DOCUMENTS

2015/0103926 A1    4/2015  Hannuksela et al.
2015/0319462 A1*  11/2015  Ramasubramonian ......................
                                                    H04N 19/70
                                                    375/240.29
2017/0006300 A1*   1/2017  Tsukuba ................. H04N 19/33

OTHER PUBLICATIONS

Ye-Kui Wang, "AHG8: Scalability-general and output layer sets", Joint Video Experts Team (JVET) of ITU-T SG 16 WP 3 and ISO/IEC JTC 1/SC 29/WG 11, Document: JVET-P0115-v2, pp. 1-6 (8 pages total).
International Search Report dated Dec. 30, 2020, in International application No. PCT/US2020/053232.
Written Opinion of the International Searching Authority dated Dec. 30, 2020, in International Application No. PCT/US2020/053232.
Extended European search report dated Oct. 9, 2023 in Application No. 20875332.7.

* cited by examiner

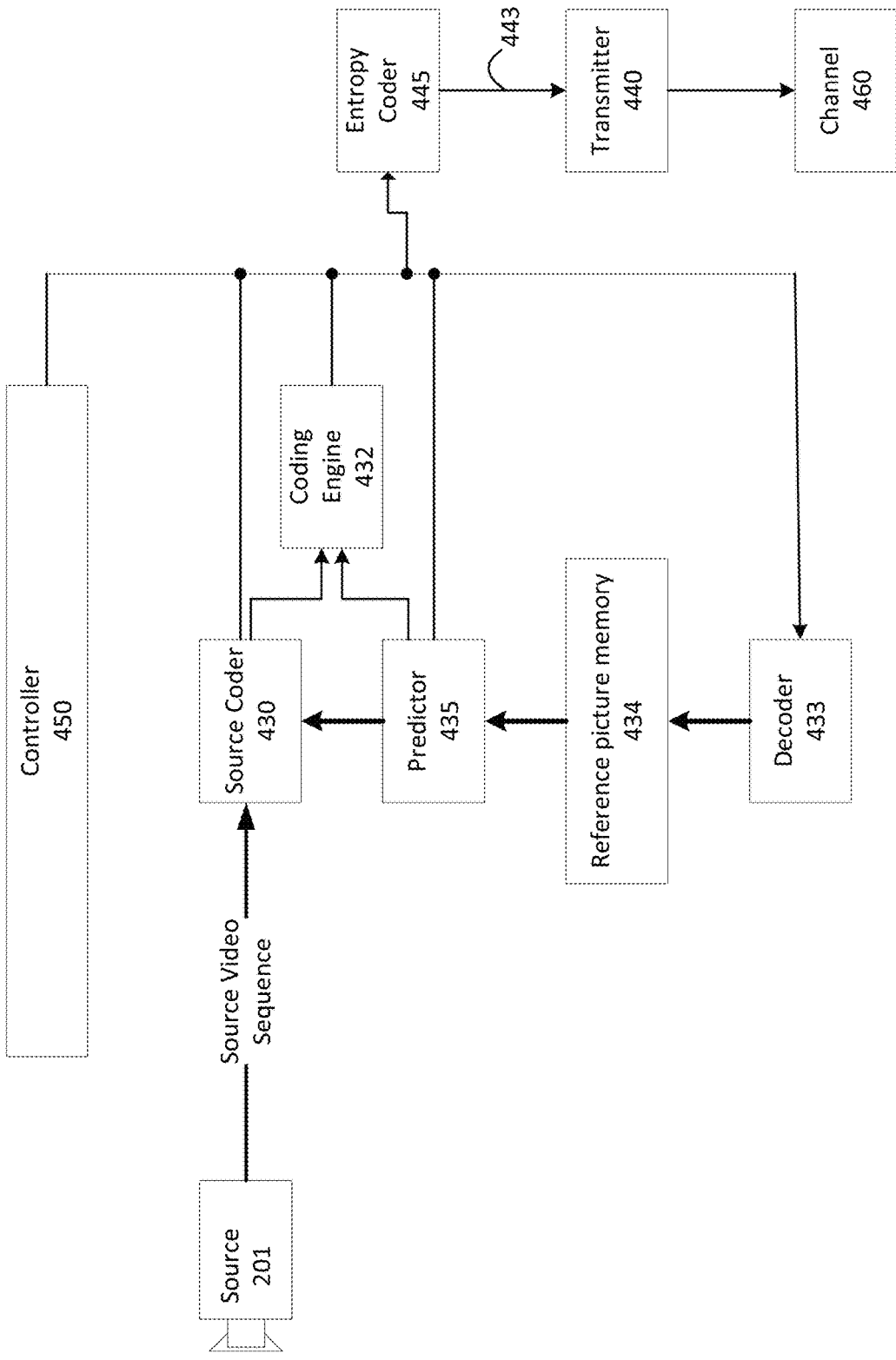

FIG. 5

| | Descriptor |
|---|---|
| video_parameter_set_rbsp( ) { | |
|   vps_video_parameter_set_id | u(4) |
|   vps_max_layers_minus1 | u(6) |
|   if( vps_max_layers_minus1 > 0 ) | |
|     vps_all_independent_layers_flag | u(1) |
|   for( i = 0; i <= vps_max_layers_minus1; i++ ) { | |
|     vps_layer_id[ i ] | u(6) |
|     if( i > 0 && !vps_all_independent_layers_flag ) { | |
|       vps_independent_layer_flag[ i ] | u(1) |
|       if( !vps_independent_layer_flag[ i ] ) | |
|         for( j = 0; j < i; j++ ) | |
|           vps_direct_ref_layer_flag[ i ][ j ] | u(1) |
|     } | |
|   } | |
|   if( vps_max_layers_minus1 > 0 ) { | |
|     if( vps_all_independent_layers_flag ) | |
|       each_layer_is_an_outputLayerSet_flag | u(1) |
|     if( !each_layer_is_an_outputLayerSet_flag ) { | |
|       if( !vps_all_independent_layers_flag ) | |
|         outputLayerSet_mode_idc | u(2) |
|       if( outputLayerSet_mode_idc == 2 ) { | |
|         num_output_layer_sets_minus1 | u(8) |
|         for( i = 1; i <= vps_max_layers_minus1; i++ ) | |
|           outputLayerSet_output_layer_flag[ i ][ j ] | u(1) |
|       } | |
|     } | |
|   } | |
|   sps_constraint_info_present_flag | u(1) |
|   sps_reserved_zero_7bits | u(7) |
|   if( sps_constraint_info_present_flag ) | |
|     general_constraint_info( ) | |
|   sps_extension_flag | u(1) |
|   if( vps_extension_flag ) | |
|     while( more_rbsp_data( ) ) | |
|       vps_extension_data_flag | u(1) |
|   rbsp_trailing_bits( ) | |
| } | |

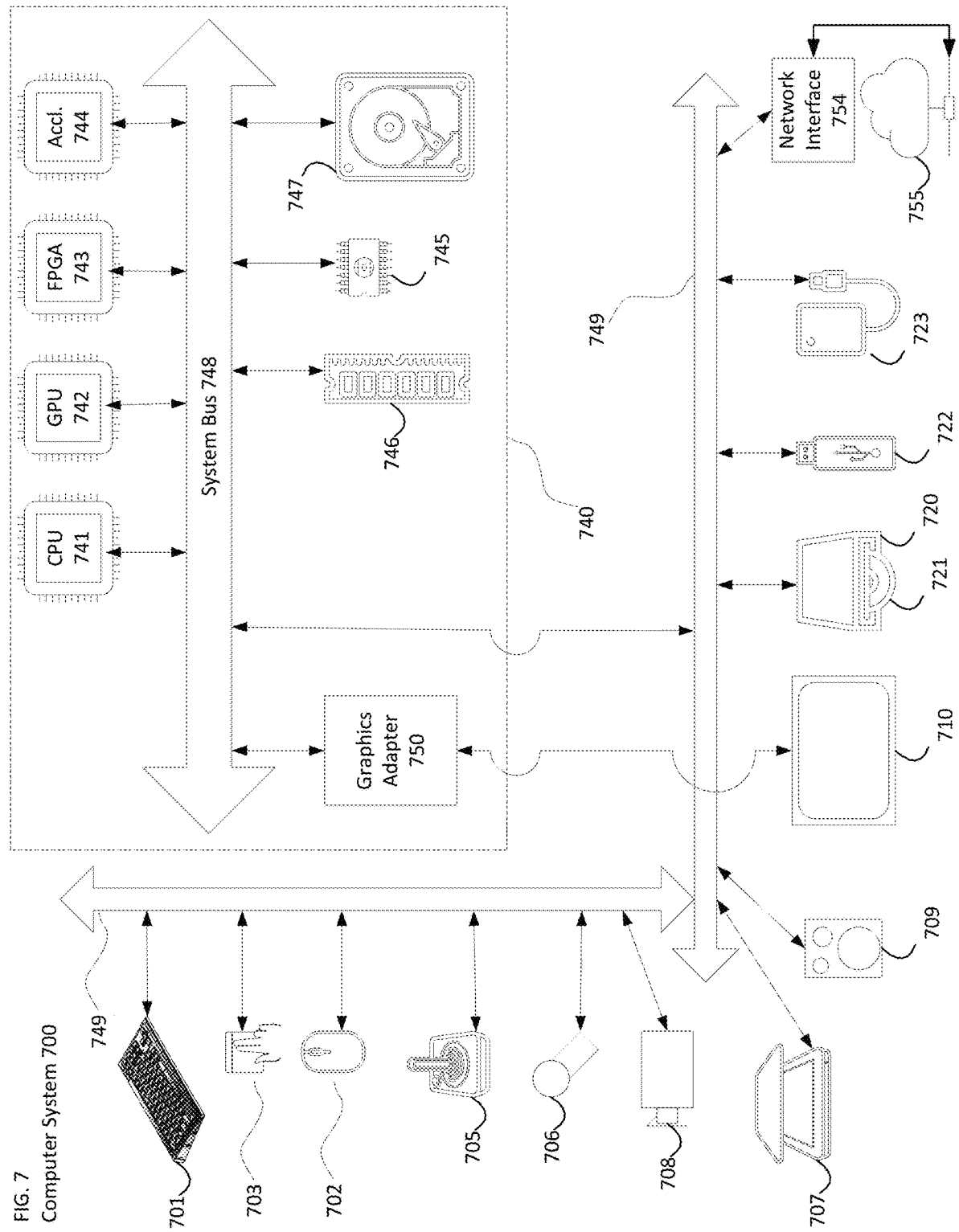

METHOD FOR OUTPUT LAYER SET SIGNALING IN SCALABLE VIDEO STREAM

CROSS-REFERENCE TO RELATED APPLICATION

This application is a continuation of U.S. application Ser. No. 17/030,950 filed Sep. 24, 2020, which claims priority under 35 U.S.C. § 119 to U.S. Provisional Application No. 62/912,275, filed on Oct. 8, 2019, in the United States Patent & Trademark Office, the disclosure of which are incorporated herein by reference in their entirety.

FIELD

The disclosed subject matter relates to video coding and decoding, and more specifically, to a signaling mechanism of output layer set for scalable video stream.

BACKGROUND

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). In 2015, these two standard organizations jointly formed the JVET (Joint Video Exploration Team) to explore the potential of developing the next video coding standard beyond HEVC. In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC. The new standard was named Versatile Video Coding (VVC), and JVET was renamed as Joint Video Expert Team.

SUMMARY

In an embodiment, there is provided a method of decoding an encoded video bitstream using at least one processor including obtaining a coded video sequence including a plurality of output layer sets from the encoded video bitstream; obtaining a first flag indicating whether each output layer set of the plurality of output layer sets includes more than one layer; based on the first flag indicating that the each output layer set includes more than the one layer, obtaining a first syntax element indicating an output layer set mode; selecting at least one layer from among layers included in the plurality of output layer sets as at least one output layer based on at least one of the first flag and the first syntax element; and outputting the at least one output layer.

In an embodiment, there is provided a device for decoding an encoded video bitstream, including at least one memory configured to store program code; and at least one processor configured to read the program code and operate as instructed by the program code, the program code including: first obtaining code configured to cause the at least one processor to obtain a coded video sequence including a plurality of output layer sets from the encoded video bitstream; second obtaining code configured to cause the at least one processor to obtain a first flag indicating whether each output layer set of the plurality of output layer sets includes more than one layer; third obtaining code configured to cause the at least one processor to, based on the first flag indicating that the each output layer set includes more than the one layer, obtain a first syntax element indicating an output layer set mode; selecting code configured to cause the at least one processor to select at least one layer from among layers included in the plurality of output layer sets as at least one output layer based on at least one of the first flag and the first syntax element; and outputting code configured to cause the at least one processor to output the at least one output layer.

In an embodiment, there is provided a non-transitory computer-readable medium storing instructions, the instructions including one or more instructions that, when executed by one or more processors of a device for decoding an encoded video bitstream, cause the one or more processors to: obtain a coded video sequence including a plurality of output layer sets from the encoded video bitstream; obtain a first flag indicating whether each output layer set of the plurality of output layer sets includes more than one layer; based on the first flag indicating that the each output layer set includes more than the one layer, obtain a first syntax element indicating an output layer set mode; select at least one layer from among layers included in the plurality of output layer sets as at least one output layer based on at least one of the first flag and the first syntax element; output the at least one output layer.

BRIEF DESCRIPTION OF THE DRAWINGS

Further features, the nature, and various advantages of the disclosed subject matter will be more apparent from the following detailed description and the accompanying drawings in which:

FIG. 4 is a schematic illustration of a simplified block diagram of an encoder in accordance with an embodiment.

FIG. 5 is a schematic illustration of an examples of a syntax table in accordance with an embodiment.

FIG. 7 is a schematic illustration of a computer system in accordance with an embodiment.

DETAILED DESCRIPTION

Figure 1:
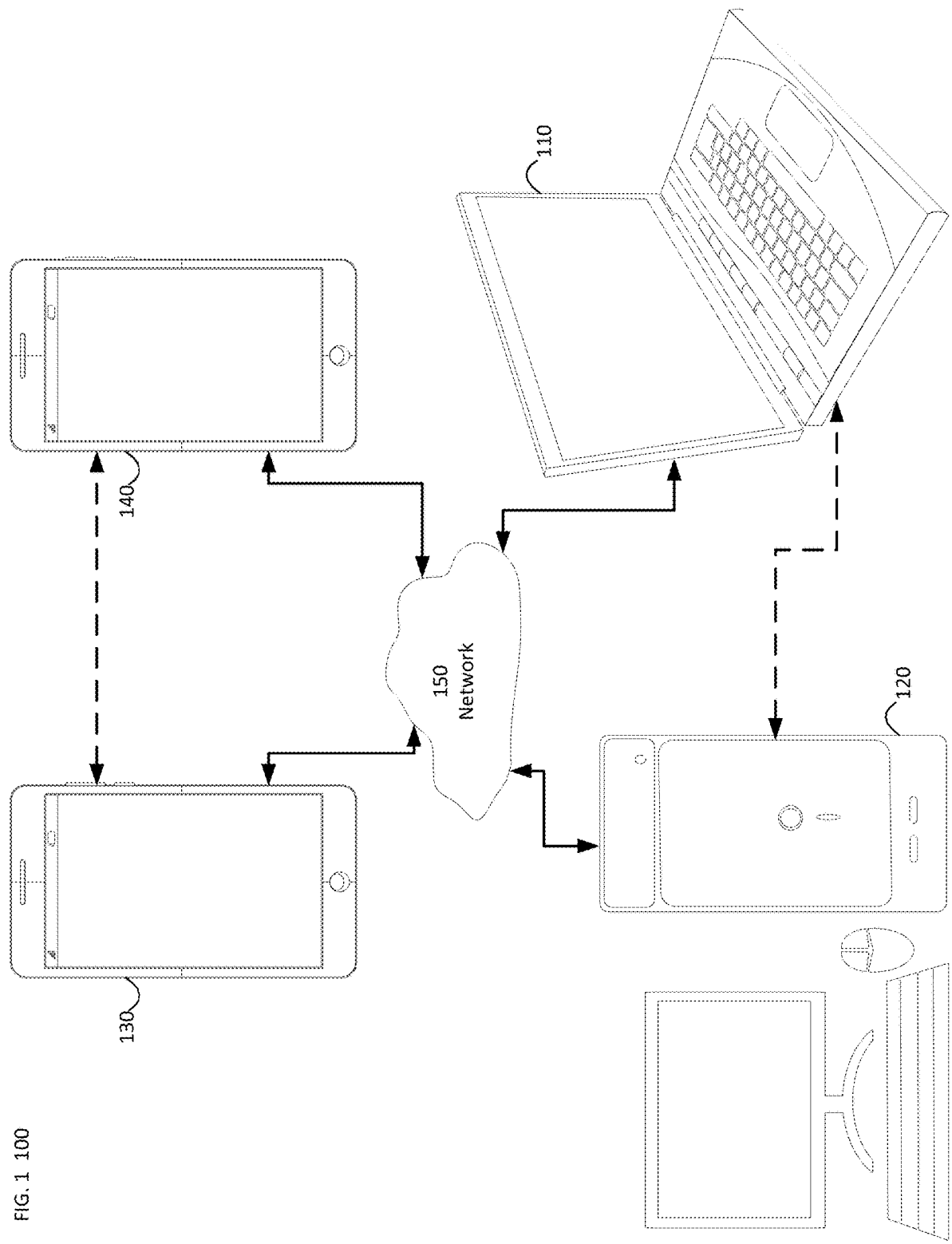
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110-120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
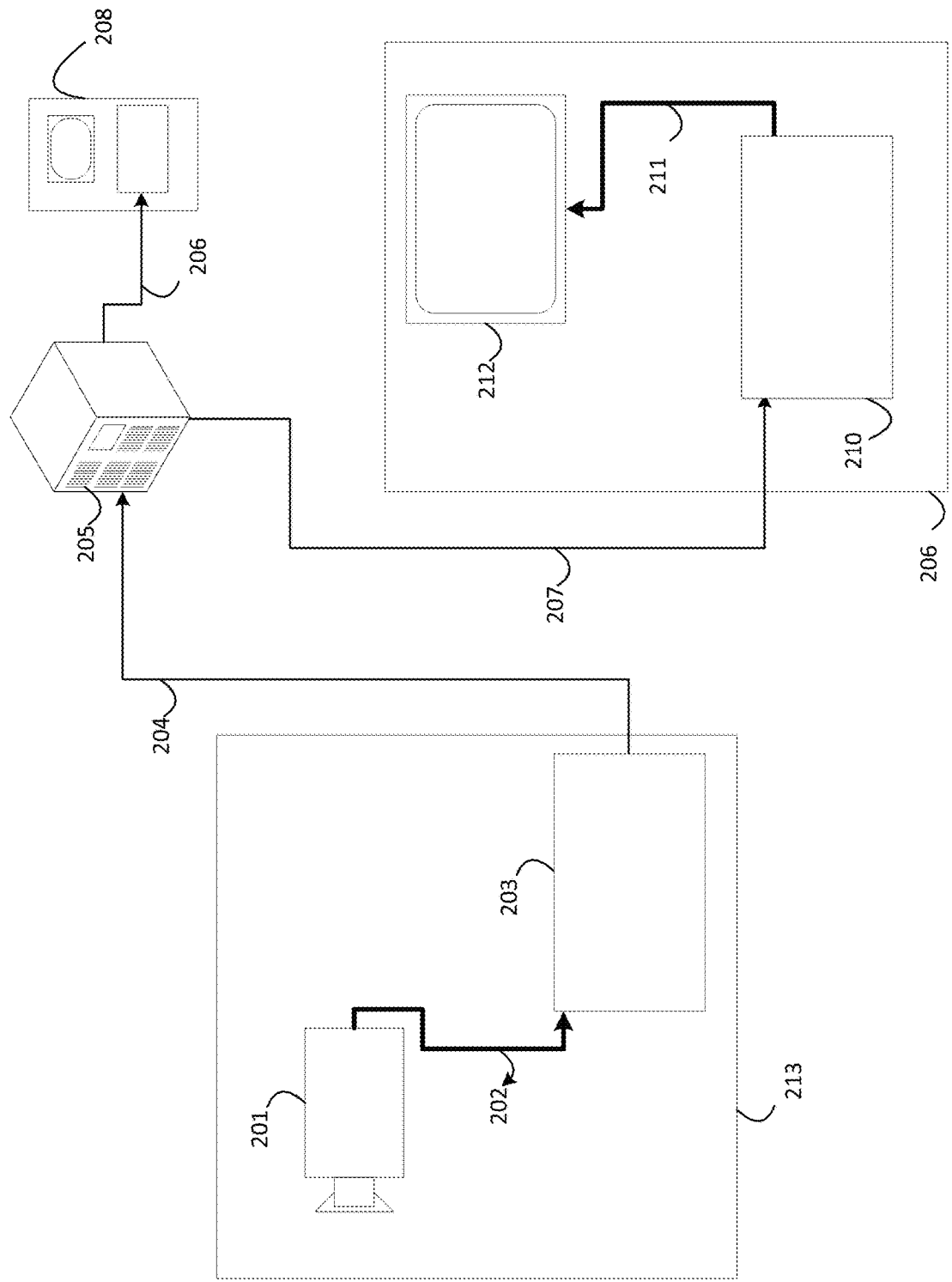
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating a for example uncompressed video sample stream (202). That sample stream (202), depicted as a bold line to emphasize a high data volume when compared to encoded video bitstreams, can be processed by an encoder (203) coupled to the camera (201). The encoder (203) can include hardware, software, or a combination thereof to enable or implement aspects of the disclosed subject matter as described in more detail below. The encoded video bitstream (204), depicted as a thin line to emphasize the lower data volume when compared to the sample stream, can be stored on a streaming server (205) for future use. One or more streaming clients (206, 208) can access the streaming server (205) to retrieve copies (207, 209) of the encoded video bitstream (204). A client (206) can include a video decoder (210) which decodes the incoming copy of the encoded video bitstream (207) and creates an outgoing video sample stream (211) that can be rendered on a display (212) or other rendering device (not depicted). In some streaming systems, the video bitstreams (204, 207, 209) can be encoded according to certain video coding/compression standards. Examples of those standards include ITU-T Recommendation H.265. Under development is a video coding standard informally known as Versatile Video Coding or VVC. The disclosed subject matter may be used in the context of VVC.

Figure 3:
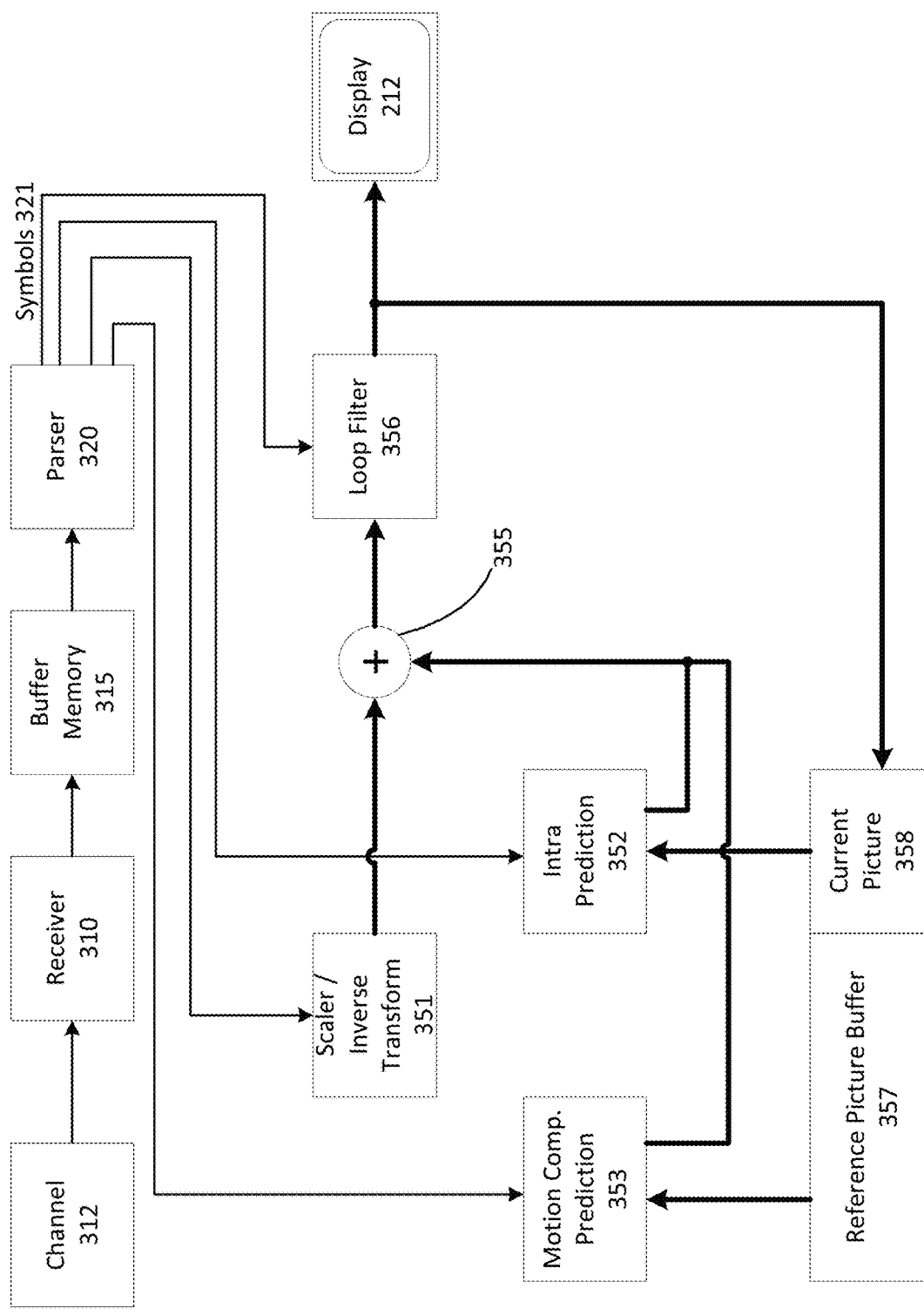
FIG. 3 is a schematic illustration of a simplified block diagram of a decoder in accordance with an embodiment.

FIG. 3 may be a functional block diagram of a video decoder (210) according to an embodiment of the present disclosure.

A receiver (310) may receive one or more codec video sequences to be decoded by the decoder (210); in the same or another embodiment, one coded video sequence at a time, where the decoding of each coded video sequence is independent from other coded video sequences. The coded video sequence may be received from a channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, a buffer memory (315) may be coupled in between receiver (310) and entropy decoder/parser (320) ("parser" henceforth). When receiver (310) is receiving data from a store/forward device of sufficient bandwidth and controllability, or from an isosynchronous network, the buffer (315) may not be needed, or can be small. For use on best effort packet networks such as the Internet, the buffer (315) may be required, can be comparatively large and can advantageously of adaptive size.

The video decoder (210) may include a parser (320) to reconstruct symbols (321) from the entropy coded video sequence. Categories of those symbols include information used to manage operation of the decoder (210), and potentially information to control a rendering device such as a display (212) that is not an integral part of the decoder but can be coupled to it, as was shown in FIG. 3. The control information for the rendering device(s) may be in the form of Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, sub-pictures, tiles, slices, bricks, macroblocks, Coding Tree Units (CTUs) Coding Units (CUs), blocks, Transform Units (TUs), Prediction Units (PUs) and so forth. A tile may indicate a rectangular region of CU/CTUs within a particular tile column and row in a picture. A brick may indicate a rectangular region of CU/CTU rows within a particular tile. A slice may indicate one or more bricks of a picture, which are contained in an NAL unit. A sub-picture may indicate an rectangular region of one or more slices in a picture. The entropy decoder/parser may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives quantized transform coefficient as well as control information, including which transform to use, block size, quantization factor, quantization scaling matrices, etc. as symbol(s) (321) from the parser (320). It can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (321) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (212) as well as stored in the reference picture memory for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture (358) can become part of the reference picture buffer (357), and a fresh current picture memory can be reallocated before commencing the reconstruction of the following coded picture.

The video decoder 210 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

FIG. 4 may be a functional block diagram of a video encoder (203) according to an embodiment of the present disclosure.

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (203) may code and compress the pictures of the source video sequence into a coded video sequence (443) in real time or under any other time constraints as required by the application. Enforcing appropriate coding speed is one function of Controller (450). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an over-simplified description, a coding loop can consist of the encoding part of an encoder (430) ("source coder" henceforth) (responsible for creating symbols based on an input picture to be coded, and a reference picture(s)), and a (local) decoder (433) embedded in the encoder (203) that reconstructs the symbols to create the sample data a (remote) decoder also would create (as any compression between symbols and coded video bitstream is lossless in the video compression technologies considered in the disclosed subject matter). That reconstructed sample stream is input to the reference picture memory (434). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (433) can be the same as of a "remote" decoder (210), which has already been described in detail above in conjunction with FIG. 3. Briefly referring also to FIG. 4, however, as symbols are available and en/decoding of symbols to a coded video sequence by entropy coder (445) and parser (320) can be lossless, the entropy decoding parts of decoder (210), including channel (312), receiver (310), buffer (315), and parser (320) may not be fully implemented in local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focusses on decoder operation. The description of encoder technologies can be abbreviated as they are the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture cache (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Embodiments may relate to a signaling mechanism of output layer set for scalable video stream. Embodiments may relate to a derivation method of the corresponding (directly dependent/independent) layers of each output layer set from direct reference layer information, when output layers are signalled for each output layer set.

In embodiments, an output layer may refer to a layer of an output layer set that is output. In embodiments, an output layer set may refer to specified set of layers, where one or more layers in the set of layers are specified to be output layers. In embodiments, an output layer set layer index may refer to an index of a layer in an OUTPUTLAYERSET, to the list of layers in the OUTPUTLAYERSET.

FIG. 5 shows an example of a syntax table relating to a video parameter set (VPS) raw byte sequence payload (RBSP) syntax, in accordance with an embodiment.

In embodiments, a VPS RBSP may be available to the decoding process prior to it being referenced, included in at least one access unit with TemporalId equal to 0 or provided through external means, and the VPS NAL unit containing the VPS RBSP may have nuh_layer_id equal to vps_layer_id[0].

All VPS NAL units with a particular value of vps_video_parameter_set_id in a CVS may have the same content.

vps_video_parameter_set_id provides an identifier for the VPS for reference by other syntax elements.

vps_max_layers_minus1 plus 1 may specify the maximum allowed number of layers in each CVS referring to the VPS.

vps_all_independent_layers_flag equal to 1 may specify that all layers in the CVS are independently coded without using inter-layer prediction. vps_all_independent_layers_flag equal to 0 may specify that one or more of the layers in the CVS may use inter-layer prediction. When not present, the value of vps_all_independent_layers_flag may be inferred to be equal to 1. When vps_all_independent_layers_flag is equal to 1, the value of vps_independent_layer_flag[i] may be inferred to be equal to 1.

vps_layer_id[i] may specify the nuh_layer_id value of the i-th layer. For any two non-negative integer values of m and n, when m is less than n, the value of vps_layer_id[m] may be less than vps_layer_id[n].

vps_independent_layer_flag[i] equal to 1 may specify that the layer with index i does not use inter-layer prediction. vps_independent_layer_flag[i] equal to 0 may specify that the layer with index i may use inter-layer prediction and vps_layer_dependency_flag[i] is present in VPS. When not present, the value of vps_independent_layer_flag[i] may be inferred to be equal to 1.

vps_direct_ref_layer_flag[i][j] equal to 0 may specify that the layer with index j is not a direct reference layer for the layer with index i. vps_direct_ref_layer_flag[i][j] equal to 1 may specify that the layer with index j is a direct reference layer for the layer with index i. When vps_direct_ref_layer_flag[i][j] is not present for i and j in the range of 0 to vps_max_layers_minus1, inclusive, it may be inferred to be equal to 0.

The variables NumDirectRefLayers[i], DirectRefLayerIdx[i][d], NumRefLayers[i], and RefLayerIdx[i][r] may be derived as follows:

```
for( i = 0; i <= vps_max_layers_minus1; i++ )
for( j = 0; j < i; j++ ) {
   dependencyFlag[ i ][ j ] = vps_direct_ref_layer_flag[ i ][ j ]
   for( k = j; k < i; k++ )
      if( vps_direct_ref_layer_flag[ i ][ k ] && dependencyFlag[ k ][ j ]
       )
         dependencyFlag[ i ][ j ] = 1
}
for( i = 0; i <= vps_max_layers_minus1; i++ ) {
for( j = 0, d = 0, r = 0, p = 0; j < i; j++ ) {
   if( direct_ref_layer_flag[ i ][ j ] )
      DirectRefLayerIdx[ i ][ d++ ] = j
   if( dependencyFlag[ i ][ j ] )
      RefLayerIdx[ i ][ r++ ] = j
}
NumDirectRefLayers[ i ] = d
NumRefLayers[ i ] = r
}
```

The variable GeneralLayerIdx[i], specifying the layer index of the layer with nuh_layer_id equal to vps_layer_id[i], may be derived as follows:

```
for( i = 0; i <= vps_max_layers_minus1; i++ )
   GeneralLayerIdx[ vps_layer_id[ i ] ] = i
``` each_layer_is_an_outputLayerSet_flag equal to 1 may specify that each output layer set contains only one layer and each layer itself in the bitstream is an output layer set with the single included layer being the only output layer. each_layer_is_an_outputLayerSet_flag equal to 0 that an output layer set may contain more than one layer. If vps_max_layers_minus1 is equal to 0, the value of the value of each_layer_is_an_outputLayerSet_flag may be inferred to be equal to 1. Otherwise, when vps_all_independent_layers_flag is equal to 0, the value of each_layer_is_an_outputLayerSet_flag may be inferred to be equal to 0.

outputLayerSet_mode_idc equal to 0 may specify that the total number of OUTPUTLAYERSETs specified by the VPS is equal to vps_max_layers_minus1+1, the i-th OUTPUTLAYERSET includes the layers with layer indices from 0 to i, inclusive, and for each OUTPUTLAYERSET only the highest layer in the OUTPUTLAYERSET is output.

outputLayerSet_mode_idc equal to 1 may specify that the total number of OUTPUTLAYERSETs specified by the VPS is equal to vps_max_layers_minus1+1, the i-th OUTPUT-LAYERSET includes the layers with layer indices from 0 to i, inclusive, and for each OUTPUTLAYERSET all layers in the OUTPUTLAYERSET are output.

outputLayerSet_mode_idc equal to 2 may specify that the total number of OUTPUTLAYERSETs specified by the VPS is explicitly signalled and for each OUTPUTLAYERSET the output layers are explicitly signalled and other layers are the layers that are direct or indirect reference layers of the output layers of the OUTPUTLAYERSET.

The value of outputLayerSet_mode_idc may be in the range of 0 to 2, inclusive. The value 3 of outputLayerSet_mode_idc is reserved for future use by ITU-T|ISO/IEC.

When vps_all_independent_layers_flag is equal to 1 and each_layer_is_an_outputLayerSet_flag is equal to 0, the value of outputLayerSet_mode_idc may be inferred to be equal to 2.

num_output_layer_sets_minus1 plus 1 may specify the total number of OUTPUTLAYERSETs specified by the VPS when outputLayerSet_mode_idc is equal to 2.

The variable TotalNumOutputLayerSets, specifying the total number of OUTPUTLAYERSETs specified by the VPS, may be derived as follows:

```
if( vps_max_layers_minus1 = = 0 )
   TotalNumOutputLayerSets = 1
else if( each_layer_is_an_outputLayerSet_flag ||
   outputLayerSet_mode_idc = = 0 ||
   outputLayerSet_mode_idc = = 1 )
   TotalNumOutputLayerSets = vps_max_layers_minus1 + 1
else if( outputLayerSet_mode_idc = = 2 )
   TotalNumOutputLayerSets = num_output_layer_sets_minus1 + 1
``` outputLayerSet_output_layer_flag[i][j] equal to 1 may specify that the layer with nuh_layer_id equal to vps_layer_id[j] is an output layer of the i-th OUTPUTLAYERSET when outputLayerSet_mode_idc is equal to 2. outputLayerSet_output_layer_flag[i][j] equal to 0 may specify that the layer with nuh_layer_id equal to vps_layer_id[j] is not an output layer of the i-th OUTPUTLAYERSET when outputLayerSet_mode_idc is equal to 2.

The variable NumOutputLayersInOutputLayerSet[i], specifying the number of output layers in the i-th OUTPUTLAYERSET, and the variable OutputLayerIdInOutputLayerSet[i][j], specifying the nuh_layer_id value of the j-th output layer in the i-th OUTPUTLAYERSET, may be derived as follows:

```
NumOutputLayersInOutputLayerSet[ 0 ] = 1
OutputLayerIdInOutputLayerSet[ 0 ][ 0 ] = vps_layer_id[ 0 ]
for( i = 1, i < TotalNumOutputLayerSets; i++ ) {
if( each_layer_is_an_outputLayerSet_flag || outputLayerSet_mode_idc
   = = 0 ) {
   NumOutputLayersInOutputLayerSet[ i ] = 1
   OutputLayerIdInOutputLayerSet[ i ][ 0 ] = vps_layer_id[ i ]
} else if( outputLayerSet_mode_idc = = 1 ) {
   NumOutputLayersInOutputLayerSet[ i ] = i + 1
   for( j = 0; j < NumOutputLayersInOutputLayerSet[ i ]; j++ )
      OutputLayerIdInOutputLayerSet[ i ][ j ] = vps_layer_id[ j ]
} else if( outputLayerSet_mode_idc = = 2 ) {
   for( j = 0, j <= vps_max_layers_minus1; j++ )
      layerIncludedFlag[ i ][ j ] = 0
   for( k = 0, j = 0; k <= vps_max_layers_minus1; k++ )
      if( outputLayerSet_output_layer_flag[ i ][ k ] ) {
         layerIncludedFlag[ i ][ j ] = 1
         OutputLayerIdx[ i ][ j ] = k
         OutputLayerIdInOutputLayerSet[ i ][ j++ ] = vps_layer_id[ k ]
      }
   NumOutputLayersInOutputLayerSet[ i ] = j
```

```
   for( j = 0; j < NumOutputLayersInOutputLayerSet[ i ]; j++ ) {
      idx = OutputLayerIdx[ i ][ j ]
      for( k = 0; k < NumRefLayers[ idx ]; k++ )
         layerIncludedFlag[ i ][ RefLayerIdx[ idx ][ k ] ] = 1
   }
}
}
```

The variable NumLayersInOutputLayerSet[i], specifying the number of layers in the i-th OUTPUTLAYERSET, and the variable LayerIdInOutputLayerSet[i][j], specifying the nuh_layer_id value of the j-th layer in the i-th OUTPUTLAYERSET, may be derived as follows:

```
NumLayersInOutputLayerSet[ 0 ] = 1
LayerIdInOutputLayerSet[ 0 ][ 0 ] = vps_layer_id[ 0 ]
for( i = 1, i < TotalNumOutputLayerSets; i++ ) {
if( each_layer_is_an_outputLayerSet_flag ) {
   NumLayersInOutputLayerSet[ i ] = 1
   LayerIdInOutputLayerSet[ i ][ 0 ] = vps_layer_id[ i ]
} else if( outputLayerSet_mode_idc = = 0 || outputLayerSet_mode_idc
   = = 1 ) {
   NumLayersInOutputLayerSet[ i ] = i + 1
   for( j = 0; j < NumLayersInOutputLayerSet[ i ]; j++ )
      LayerIdInOutputLayerSet[ i ][ j ] = vps_layer_id[ j ]
} else if( outputLayerSet_mode_idc = = 2 ) {
   for( k = 0, j = 0; k <= vps_max_layers_minus1; k++ )
      if( layerIncludedFlag[ i ][ k ] )
         LayerIdInOutputLayerSet[ i ][ j++ ] = vps_layer_id[ k ]
   NumLayersInOutputLayerSet[ i ] = j
}
}
```

The variable OutputLayerSetLayerIdx[i][j], specifying the OUTPUTLAYERSET layer index of the layer with nuh_layer_id equal to LayerIdInOutputLayerSet[i][j], may be derived as follows:

```
for( i = 0, i < TotalNumOutputLayerSets; i++ )
for j = 0; j < NumLayersInOutputLayerSet[ i ]; j++ )
   OutputLayerSetLayeIdx[ i ][ LayerIdInOutputLayerSet[ i ][ j ] ] = j
```

The lowest layer in each OUTPUTLAYERSET may be an independent layer. In other words, for each i in the range of 0 to TotalNumOutputLayerSets−1, inclusive, the value of vps_independent_layer_flag[GeneralLayerIdx[LayerIdInOutputLayerSet[i][0]]] may be equal to 1.

Each layer may be included in at least one OUTPUTLAYERSET specified by the VPS. In other words, for each layer with a particular value of nuh_layer_id nuhLayerId, equal to one of vps_layer_id[k] for k in the range of 0 to vps_max_layers_minus1, inclusive, there may be at least one pair of values of i and j, where i is in the range of 0 to TotalNumOutputLayerSets−1, inclusive, and j is in the range of NumLayersInOutputLayerSet[i]−1, inclusive, such that the value of LayerIdInOutputLayerSet[i][j] is equal to nuhLayerId.

vps_constraint_info_present_flag equal to 1 may specify that the general_constraint_info( ) syntax structure is present in the VPS. vps_constraint_info_present_flag equal to 0 may specify that the general_constraint_info( ) syntax structure is not present in the VPS.

vps_reserved_zero_7bits may be equal to 0 in bitstreams conforming to this version of this Specification. Other values for vps_reserved_zero_7bits are reserved for future use by ITU-T|ISO/IEC. Decoders may ignore the value of vps_reserved_zero_7bits.

vps_extension_flag equal to 0 may specify that no vps_extension_data_flag syntax elements are present in the VPS RBSP syntax structure. vps_extension_flag equal to 1 may specify that there are vps_extension_data_flag syntax elements present in the VPS RBSP syntax structure.

vps_extension_data_flag may have any value. Its presence and value do not affect decoder conformance to profiles specified in this version of this Specification. Decoders conforming to this version of this Specification may ignore all vps_extension_data_flag syntax elements.

Figure 6:
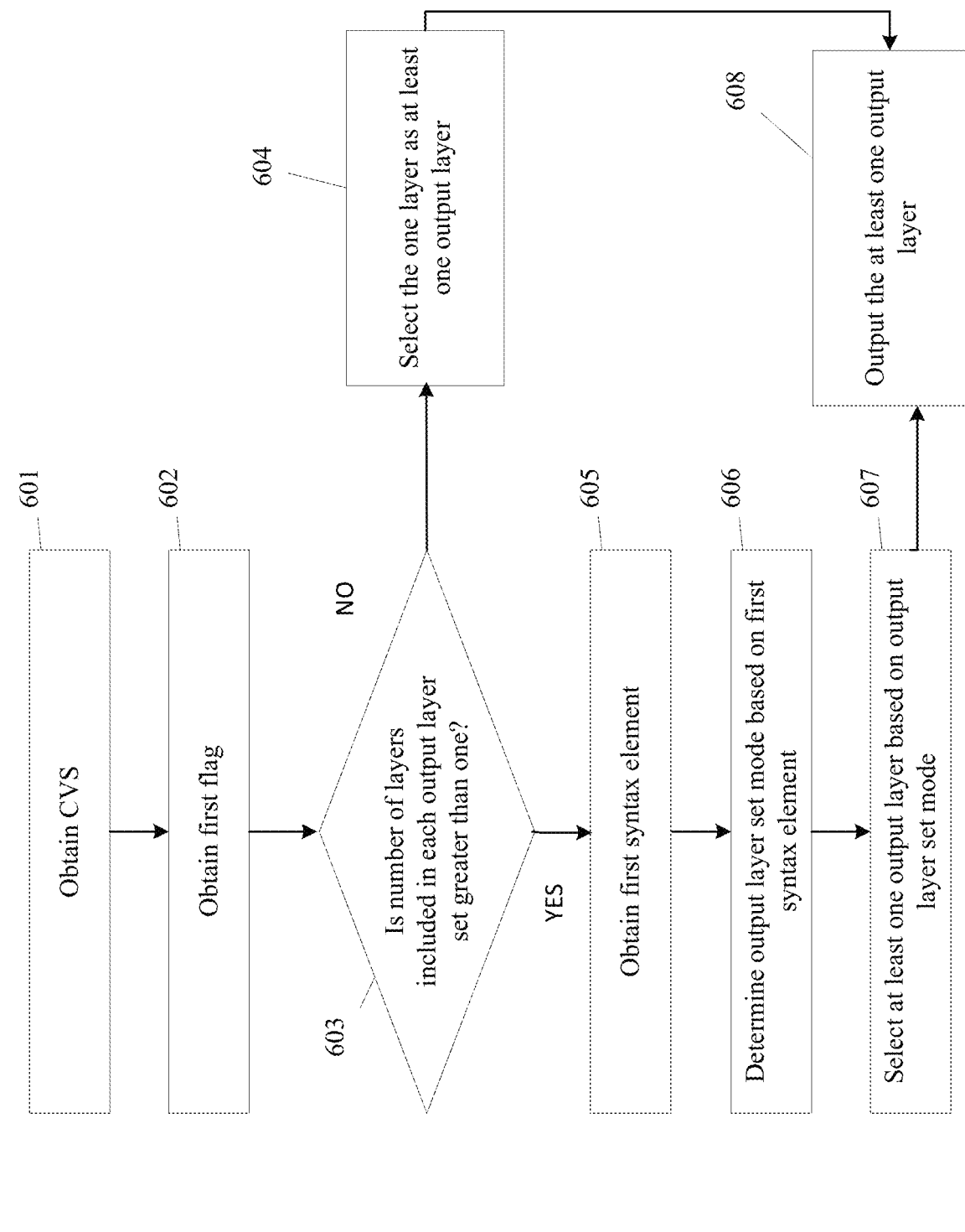
FIG. 6 is a flowchart of an example process for decoding an encoded video bitstream in accordance with an embodiment.

FIG. 6 is a flowchart is an example process 600 for decoding an encoded video bitstream. In some implementations, one or more process blocks of FIG. 6 may be performed by decoder 210. In some implementations, one or more process blocks of FIG. 6 may be performed by another device or a group of devices separate from or including decoder 210, such as encoder 203.

As shown in FIG. 6, process 600 may include obtaining a coded video sequence including a plurality of output layer sets from the encoded video bitstream (block 601).

As further shown in FIG. 6, process 600 may include obtaining a first flag (block 602).

As further shown in FIG. 6, process 600 may include, determining from the first flag whether each output layer set of the plurality of output layer sets includes more than one layer (block 603).

As further shown in FIG. 6, process 600 may include, based on the first flag indicating that the each output layer set includes only a single layer (NO at block 603), selecting the single layer of each output layer set as at least one output layer (block 604) and outputting the at least one output layer (block 608).

As further shown in FIG. 6, based on the first flag indicating that each output layer set includes more than one layer (YES at block 603), process 600 may proceed to block 605, block 606, block 607, and block 608.

As further shown in FIG. 6, process 600 may include obtaining a first syntax element indicating an output layer set mode (block 605).

As further shown in FIG. 6, process 600 may include determining output layer set mode based on the first syntax element (block 606).

As further shown in FIG. 6, process 600 may include selecting at least one layer from among layers included in the plurality of output layer sets as the at least one output layer based on the output layer set mode (block 607).

As further shown in FIG. 6, process 600 may include outputting the at least one output layer (block 608).

In an embodiment, the first flag and the first syntax element may be signaled in a video parameter set (VPS).

In an embodiment, the one layer may be selected as the at least one output layer based on the first flag indicating that the each output layer set includes only the one layer.

In an embodiment, a highest layer of the each output layer set may be selected as the at least one output layer based on the first syntax element indicating that the output layer set mode is a first mode.

In an embodiment, all of the layers included in the plurality of output layer sets may be selected as the at least one output layer based on the first syntax element indicating that the output layer set mode is a second mode.

In an embodiment, based on the first syntax element indicating that the output layer set mode is a third mode, the at least one output layer may be selected from among the layers included in the plurality of output layer sets based on a second syntax element signaled in the encoded video bitstream.

In an embodiment, based on the first syntax element indicating that the output layer set mode is the third mode, unselected layers from among the layers included in the plurality of output layer sets may be used as reference layers for the at least one output layer.

In an embodiment, the output layer set mode may be inferred to be the third mode based on the first flag indicating that the each output layer set includes more than the one layer, and a second flag indicating that all of the layers included in the plurality of output layer sets are independently coded.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media. For example, FIG. 7 shows a computer system 700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710 and associated graphics adapter 750, data-glove, joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data-glove, or joystick 705, but there can also be tactile feedback devices that do not serve as input devices), audio output devices (such as: speakers 709, headphones (not depicted)), visual output devices (such as screens 710 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 700 can also include interface(s) to one or more communication networks (1155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters (1154) that attached to certain general purpose data ports or peripheral buses (1149) (such as, for example universal serial bus (USB) ports of the computer system 700; others are commonly integrated into the core of the computer system 700 by attachment to a system bus as described below (for example Ethernet interface into a PC computer system or cellular network interface into a smartphone computer system). As an example, network 755 may be connected to peripheral bus 749 using network interface 754. Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces (1154) as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators 744 for certain tasks, and so forth. These devices, along with Read-only memory (ROM) 745, Random-access memory (RAM) 746, internal mass storage such as internal non-user accessible hard drives, solid-state drives (SSDs), and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include peripheral component interconnect (PCI), USB, and the like.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method of encoding video data using at least one processor, the method comprising:
   obtaining video data;
   processing the video data to determine a plurality of output layer sets;
   determining a first flag indicating whether each output layer set of the plurality of output layer sets includes more than one layer;
   determining a second flag indicating that all of layers included in the plurality of output layer sets are independently coded;
   based on the first flag indicating that the each output layer set includes more than the one layer and the second flag indicating that the all of the layers included in the plurality of output layer sets are independently coded, determining an output layer set mode;
   selecting at least one layer from among the layers included in the plurality of output layer sets as at least one output layer based on the output layer set mode;
   setting, for each unselected layer that is not selected as the at least one output layer, a third flag indicating whether a respective unselected layer is a direct reference layer for the selected at least one output layer; and
   generating an encoded video bitstream based on the first flag, the second flag, the third flag, and the plurality of output layer sets.

2. The method of claim 1, wherein the first flag and the second flag are signaled in a video parameter set (VPS).

3. The method of claim 1, wherein a highest layer of the each output layer set is selected as the at least one output layer based on the output layer set mode being a first mode.

4. The method of claim 1, wherein all of the layers included in the plurality of output layer sets are selected as the at least one output layer based on the output layer set mode being a second mode.

5. The method of claim 1, wherein based on the output layer set mode being a third mode, the at least one output layer is selected from among the layers included in the plurality of output layer sets based on a syntax element signaled in the encoded video bitstream.

6. The method of claim 5, wherein based on at the output layer set mode being the third mode, the unselected layers from among the layers included in the plurality of output layer sets are used as reference layers for the at least one output layer.

7. The method of claim 5, wherein the output layer set mode is inferred to be the third mode based on the first flag indicating that the each output layer set includes more than the one layer, and the second flag indicating that all of the layers included in the plurality of output layer sets are independently coded.

8. A device for encoding video data, the device comprising:
   at least one memory configured to store program code; and
   at least one processor configured to read the program code and operate as instructed by the program code, the program code including:
      first obtaining code configured to cause the at least one processor to obtain video data;
      processing code configured to cause the at least one processor to obtain the video data to determine a plurality of output layer sets;
      first determining code configured to cause the at least one processor to determine a first flag indicating whether each output layer set of the plurality of output layer sets includes more than one layer;
      second determining a second flag indicating that all of layers included in the plurality of output layer sets are independently coded,
      third determining code configured to cause the at least one processor to, based on the first flag indicating that the each output layer set includes more than the one layer and the second flag indicating that the all of the layers included in the plurality of output layer sets are independently coded, determine a an output layer set mode;
      selecting code configured to cause the at least one processor to select at least one layer from among the layers included in the plurality of output layer sets as at least one output layer based on the output layer set mode;
      setting code configured to cause the at least one processor to, set, for each unselected layer that is not selected as the at least one output layer, a third flag indicating whether a respective unselected layer is a direct reference layer for the selected at least one output layer; and
      generating code configured to cause the at least one processor to generate an encoded video bitstream based on the first flag, the second flag, and the plurality of output layer sets.

9. The device of claim 8, wherein the first flag and the second flag are signaled in a video parameter set (VPS).

10. The device of claim 8, wherein a highest layer of the each output layer set is selected as the at least one output layer based on the output layer set mode being a first mode.

11. The device of claim 8, wherein all of the layers included in the plurality of output layer sets are selected as the at least one output layer based on the output layer set mode being a second mode.

12. The device of claim 8, wherein based on the output layer set mode being a third mode, the at least one output layer is selected from among the layers included in the plurality of output layer sets based on a syntax element signaled in the encoded video bitstream.

13. The device of claim 12, wherein based on the output layer set mode being the third mode, the unselected layers from among the layers included in the plurality of output layer sets are used as reference layers for the at least one output layer.

14. The device of claim 12, wherein the output layer set mode is inferred to be the third mode based on the first flag indicating that the each output layer set includes more than the one layer, and the second flag indicating that all of the layers included in the plurality of output layer sets are independently coded.

15. A non-transitory computer-readable medium storing instructions, the instructions comprising: one or more instructions that, when executed by one or more processors of a device for encoding video data, cause the one or more processors to:
   obtain video data;
   process the video data to determine a plurality of output layer sets;

determine a first flag indicating whether each output layer set of the plurality of output layer sets includes more than one layer;

determine a second flag indicating that all of layers included in the plurality of output layer sets are independently coded;

based on the first flag indicating that the each output layer set includes more than the one layer and the second flag indicating that the all of the layers included in the plurality of output layer sets are independently coded, determine an output layer set mode;

select at least one layer from the among layers included in the plurality of output layer sets as at least one output layer based on the output layer set mode;

set, for each unselected layer that is not selected as the at least one output layer, a third flag indicating whether a respective unselected layer is a direct reference layer for the selected at least one output layer; and generate an encoded video bitstream based on the first flag, the second flag, and the plurality of output layer sets.

16. The non-transitory computer-readable medium of claim 15, wherein a highest layer of the each output layer set is selected as the at least one output layer based on the output layer set mode being a first mode.

17. The non-transitory computer-readable medium of claim 15, wherein all of the layers included in the plurality of output layer sets are selected as the output layer set mode being a second mode.

18. The non-transitory computer-readable medium of claim 15, wherein based on the output layer set mode being a third mode, the at least one output layer is selected from among the layers included in the plurality of output layer sets based on a syntax element signaled in the encoded video bitstream.

19. The non-transitory computer-readable medium of claim 18, wherein based on the output layer set mode being the third mode, the unselected layers from among the layers included in the plurality of output layer sets are used as reference layers for the at least one output layer.

* * * * *